(12) United States Patent
Lee et al.

(10) Patent No.: US 8,540,251 B2
(45) Date of Patent: Sep. 24, 2013

(54) ACTIVE ROLL CONTROL SYSTEM

(75) Inventors: Un Koo Lee, Seoul (KR); Sung Bae Jang, Suwon (KR); Pil Young Jeong, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/608,329

(22) Filed: Sep. 10, 2012

(65) Prior Publication Data

US 2013/0147135 A1 Jun. 13, 2013

(30) Foreign Application Priority Data

Dec. 12, 2011 (CN) .......................... 10-2011-0132819

(51) Int. Cl.
*B60G 17/015* (2006.01)
(52) U.S. Cl.
USPC ..................................................... 280/5.508
(58) Field of Classification Search
USPC .......... 280/5.504, 5.506, 5.507, 5.508, 5.509, 280/5.51, 5.511, 689, 124.103, 124.106, 280/124.107; 74/424.6, 89.23
See application file for complete search history.

(56) References Cited

U.S. PATENT DOCUMENTS

| 4,206,935 | A | * | 6/1980 | Sheppard et al. | .......... 280/5.508 |
| 4,648,620 | A | * | 3/1987 | Nuss | .......... 280/5.511 |
| 5,186,486 | A | * | 2/1993 | Hynds et al. | .......... 280/124.107 |
| 6,175,792 | B1 | | 1/2001 | Jones et al. | |
| 7,427,073 | B2 | * | 9/2008 | Won | .......... 280/5.507 |

FOREIGN PATENT DOCUMENTS

| JP | 5-213040 A | 8/1993 |
| JP | 10-297312 A | 11/1998 |
| KR | 10-0521217 B1 | 10/2005 |
| KR | 10-0629799 B1 | 9/2006 |

* cited by examiner

*Primary Examiner* — Faye M. Fleming
(74) *Attorney, Agent, or Firm* — Morgan, Lewis & Bockius LLP

(57) ABSTRACT

An active roll control system (ARCS) can actively control roll of a stabilizer bar connected to a pair of upper arms mounted respectively at both sides of a vehicle body through stabilizer links. The system may include a rail plate mounted in a space formed by bending a middle portion of the suspension arm, a connector having a screw hole and a connecting end that is connected to the stabilizer link, upper and lower portions of the connector being movable along the rail plate, a drive motor coupled to the suspension arm and provided with a screw shaft, wherein the connector is movable along the rail plate, and a cover covering the space in a state of being coupled with the rail plate and having a slot formed at a lower surface thereof, wherein the stabilizer link being inserted in and movable along the slot.

12 Claims, 7 Drawing Sheets

ACTIVE ROLL CONTROL SYSTEM

CROSS-REFERENCE TO RELATED APPLICATION

The present application claims priority of Korean Patent Application Number 10-2011-0132819 filed Dec. 12, 2011, the entire contents of which application is incorporated herein for all purposes by this reference.

BACKGROUND OF INVENTION

1. Field of Invention

The present invention relates to an active roll control system for a vehicle. More particularly, the present invention relates to an active roll control system (ARCS) which can actively control roll of a stabilizer bar connected to a pair of upper arms mounted respectively at both sides of a vehicle body through stabilizer links.

2. Description of Related Art

Generally, a suspension system of a vehicle connects an axle to a vehicle body so as to control vibration or impact transmitted from a road to the axle when driving not to be directly transmitted to the vehicle body. Accordingly, the suspension system of a vehicle prevents the vehicle body and freight from being damaged and improves ride comfort.

Such a suspension system, as shown in FIG. 1, includes a chassis spring 101 relieving impact from the road, a shock absorber 103 reducing free vibration of the chassis spring 101 and improving the ride comfort, and a stabilizer bar 105 suppressing roll of a vehicle (it means that a vehicle inclines with reference to a length direction of the vehicle body).

Herein, the stabilizer bar 105 includes a straight portion and both ends. Both sides of the straight portion are mounted at the vehicle body 107, and the both ends are mounted at a lower arm 109 or a strut bar that is a suspension arm through the stabilizer link 113. Therefore, in a case that left and right wheels 111 move to the same direction (upward direction or downward direction), the stabilizer bar 105 does not work. On the contrary, in a case that the left and right wheels 111 move to the opposite direction (one moves upwardly and the other moves downwardly), the stabilizer bar 105 is twisted and suppresses the roll of the vehicle body 107 by torsional restoring force.

That is, when the vehicle body 107 inclines toward a turning axis by the centrifugal force in a case of turning or heights of the left and right wheels is different from each other by bump or rebound of the vehicle, the stabilizer bar 105 is twisted and stabilizes position of the vehicle body by torsional restoring force.

Since a conventional stabilizer bar 105, however, has a constant roll rigidity, it is insufficient to secure turning stability under various driving conditions by means of torsional elastic force of the stabilizer bar 105 only.

Recently, an active roll control system having an actuator consisting of a hydraulic pressure cylinder 115 and connected to an end of the stabilizer bar 105 so as to control roll actively has been developed as shown in FIG. 2.

The active roll control system uses the hydraulic pressure cylinder 115 instead of the stabilizer link 113 connecting the lower arm 109 and the end of the stabilizer bar 105 so as to change a connecting length between the end of the stabilizer bar 105 and the lower arm 109. Therefore, roll rigidity of the stabilizer bar 105 is changed.

That is, a lower end of the hydraulic pressure cylinder 115 is connected to the lower arm 109 and a front end of a piston rod 117 of the hydraulic pressure cylinder 115 is connected to the end of the stabilizer bar 105 through a ball joint 119 according to the active roll control system.

According to the active roll control system, an electronic control unit (ECU) controls a hydraulic pressure system including valves, hydraulic pressure pumps, and so on based on signals output from an acceleration sensor, a height sensor, and a steering sensor of the vehicle so as to enhance roll of the vehicle.

The lower end of the hydraulic pressure cylinder 115, however, should be assembled through a separate bracket 121 having a lower end protruded under the lower arm 109 so as to secure an operation stroke of the hydraulic pressure cylinder 115 (i.e., actuator) to the maximum. Such a layout can be designed but productivity may be deteriorated.

Since the hydraulic pressure cylinder 115 is used as the actuator, components for generating and delivering hydraulic pressure (i.e., hydraulic pressure pumps, hydraulic pressure lines, valves and so on) should be necessary.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an active roll control system having advantages of actively controlling roll rigidity of a vehicle by controlling a mounting position of a stabilizer link on a suspension arm through a driving unit disposed at a lower portion of the suspension arm and driven by a motor so as to change a lever ratio of the stabilizer link.

Various aspects of the present invention provide for an active roll control system which can be easily controlled and has a handy layout when being mounted on a suspension arm is provided.

Various aspects of the present invention provide for an active roll control system which minimizes offset between a stabilizer link and a suspension arm and effects of torsional moment by using a connector guided by a roller bearing.

Various aspects of the present invention provide for an active roll control system that is adapted to actively control roll rigidity of a vehicle by adjusting a mounting position of a stabilizer link connecting a suspension arm with a stabilizer bar of the vehicle on the suspension arm according to a driving condition of vehicle is disclosed.

The active roll control system may include a rail plate mounted in a space opened to one direction, the space being formed by bending a middle portion of the suspension arm; a connector having a screw hole formed at a center portion thereof and a connecting end formed at one side surface thereof and connected to an end of the stabilizer link, upper and lower portions of the connector being mounted on the rail plate so as to be movable along the rail plate; a drive motor coupled to an inboard end of the suspension arm and provided with a rotation shaft that is a screw shaft, the rotation shaft being engaged to the screw hole such that the connector is movable along the rail plate; and a cover engaged to the suspension arm so as to cover the space in a state of being coupled with the rail plate and having a slot formed at a lower surface thereof, the stabilizer link being inserted in and movable along the slot.

The active roll control system may include roller bearings mounted at the upper and lower portions of the rail plate.

The suspension arm may be an upper arm rotatably connected to a sub frame and a knuckle of the vehicle.

Upper and lower surfaces of the rail plate may be connected to each other by a side thereof such that the roller bearings of the connector are slidably supported by the upper and lower surfaces of the rail plate.

The side of the rail plate may be assembled to a side of the suspension arm by a bolt.

A pair of roller bearings may be mounted at the upper portion of the connector and a pair of roller bearings may be mounted at the lower portion of the connector.

An upper end of the stabilizer link may be rotatably assembled to the connecting end of the connector.

A front end of the screw shaft may be rotatably supported by a bearing that is press-fitted to an outboard end of the suspension arm.

The drive motor may be a servo motor, rotation speed and rotating direction of which can be controlled.

The drive motor may be assembled to the inboard end of the suspension arm with a spacer being interposed therebetween.

Catching grooves may be formed respectively at the upper and lower surfaces of the rail plate, and catching protrusions inserted in the catching grooves may be formed respective at upper and lower surfaces of the cover.

The cover may be assembled respectively to outboard and inboard end portions of the opening of the suspension arm by bolts.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended'to cover not only the exemplary embodiments, but also various alternatives, modifications, equivalents and other embodiments, which may be included within the spirit and scope of the invention as defined by the appended claims.

Description of components that are not necessary for explaining the present invention clearly will be omitted.

Figure 1:
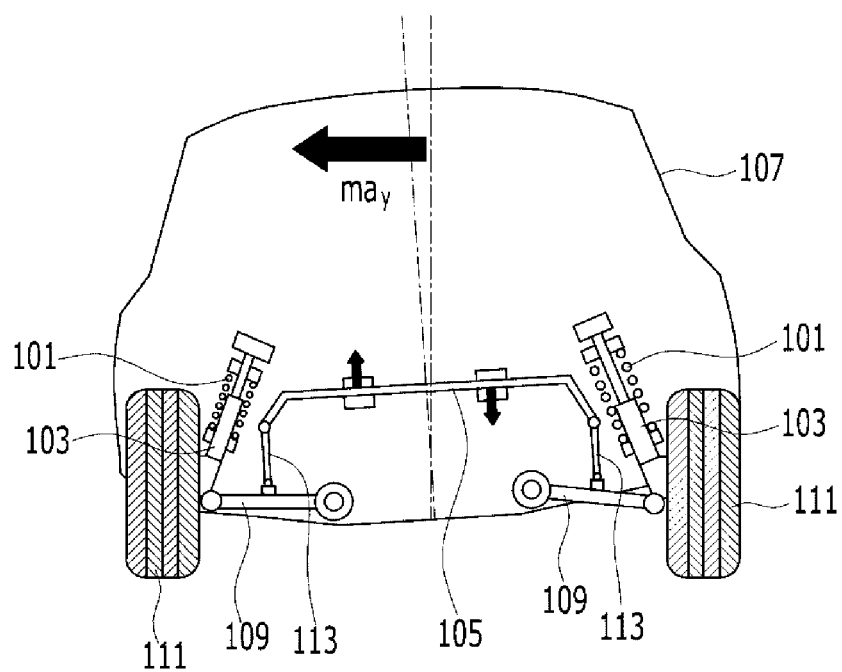
FIG. 1 is a schematic diagram of a conventional suspension system for a vehicle.
Figure 2:
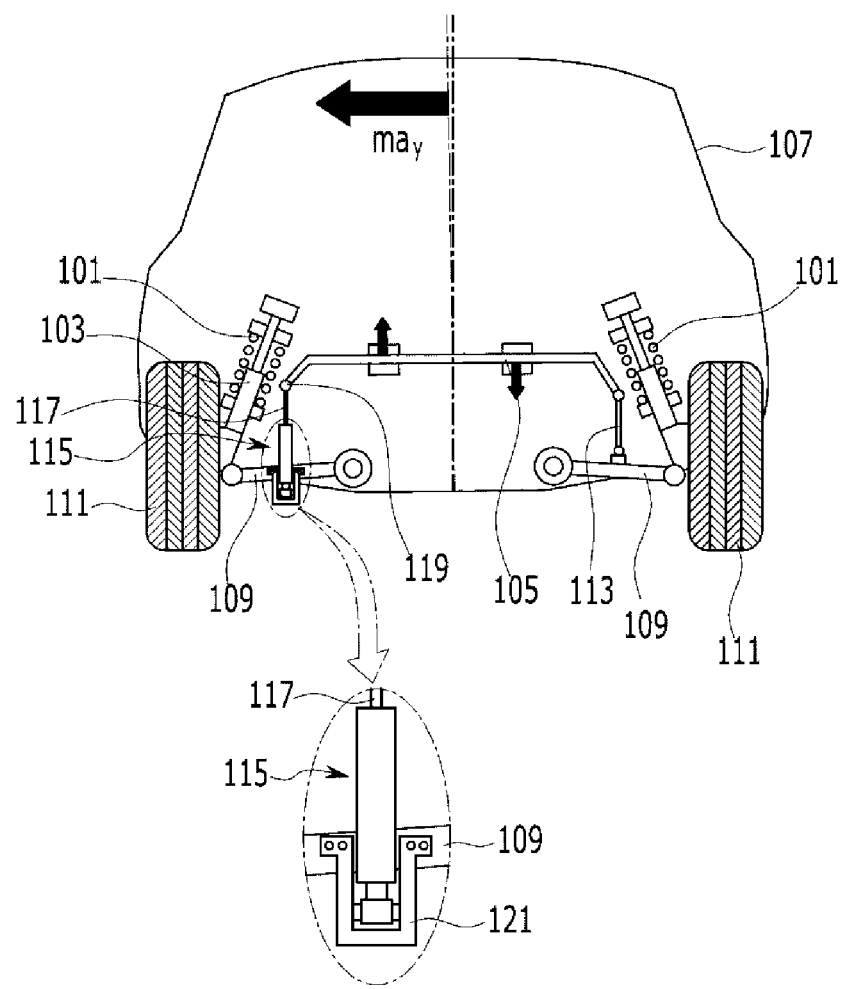
FIG. 2 is a schematic diagram of a suspension system for a vehicle to which an active roll control system for the vehicle according to conventional arts is applied.
Figure 3:
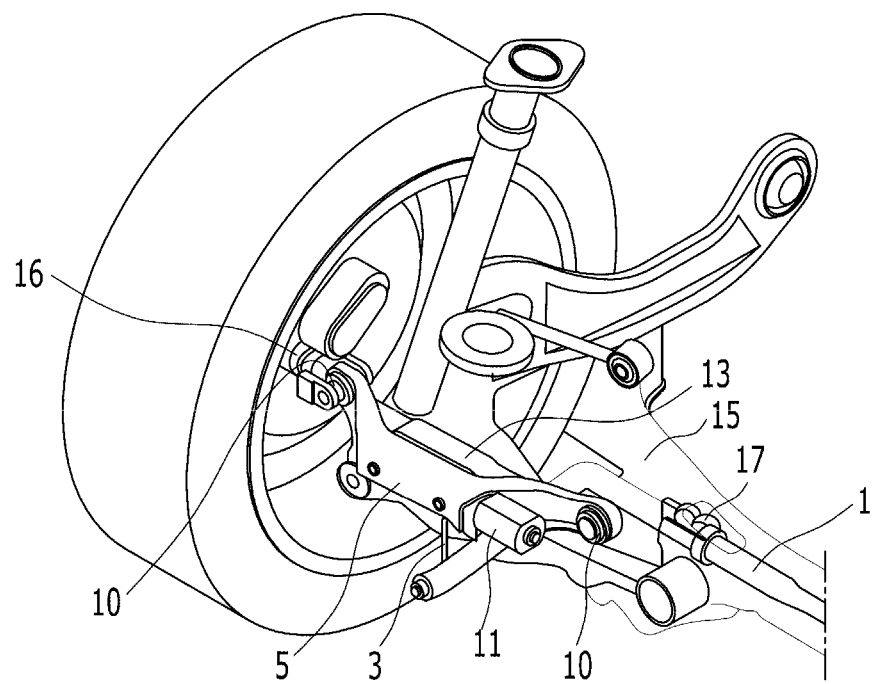
FIG. 3 is a perspective view of an exemplary active roll control system according to the present invention.

For convenience of explaining various embodiments of the present invention, the left side will be called an outboard side and the right side will be called an inboard side in FIG. 3.

Figure 4:
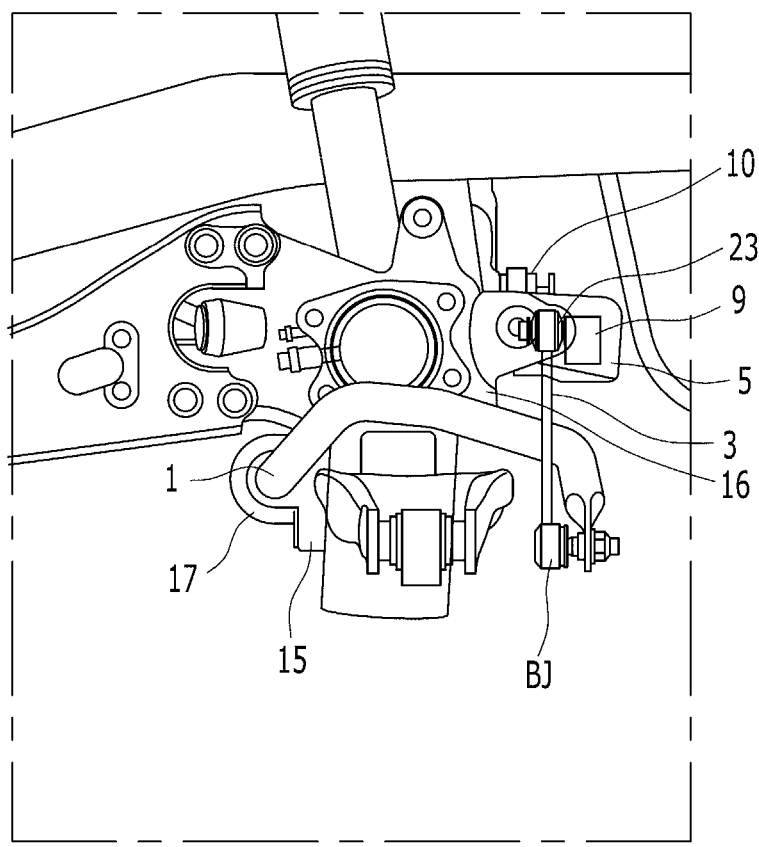
FIG. 4 is a front view of an exemplary active roll control system according to the present invention.
Figure 5:
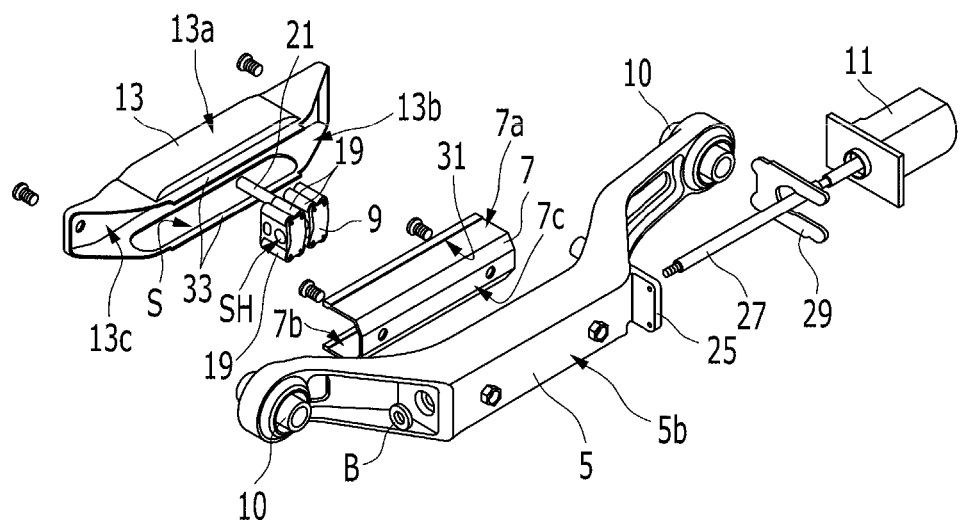
FIG. 5 is an exploded perspective view of an exemplary active roll control system according to the present invention.

FIG. 3 is a perspective view of an active roll control system according to various embodiments of the present invention, FIG. 4 is a front view of an active roll control system according to various embodiments of the present invention, and FIG. 5 is an exploded perspective view of an active roll control system according to various embodiments of the present invention.

Referring to FIG. 3 to FIG. 5, an active roll control system according to various embodiments of the present invention is adapted to improve roll performance of a vehicle actively by changing roll rigidity of a stabilizer bar 1 according to a driving condition of the vehicle.

The active roll control system includes the stabilizer bar 1, a stabilizer link 3, and a rail plate 7, a connector 9, a drive motor 11 and a cover 13 that are disposed on an upper arm 5 that is a suspension arm.

A side portion of the stabilizer bar 1 is mounted on a sub frame 15 of a vehicle body through a mounting bushing 17.

In addition, a lower end of the stabilizer link 3 is connected to an end of the stabilizer bar 1 through a ball joint BJ.

Figure 6:
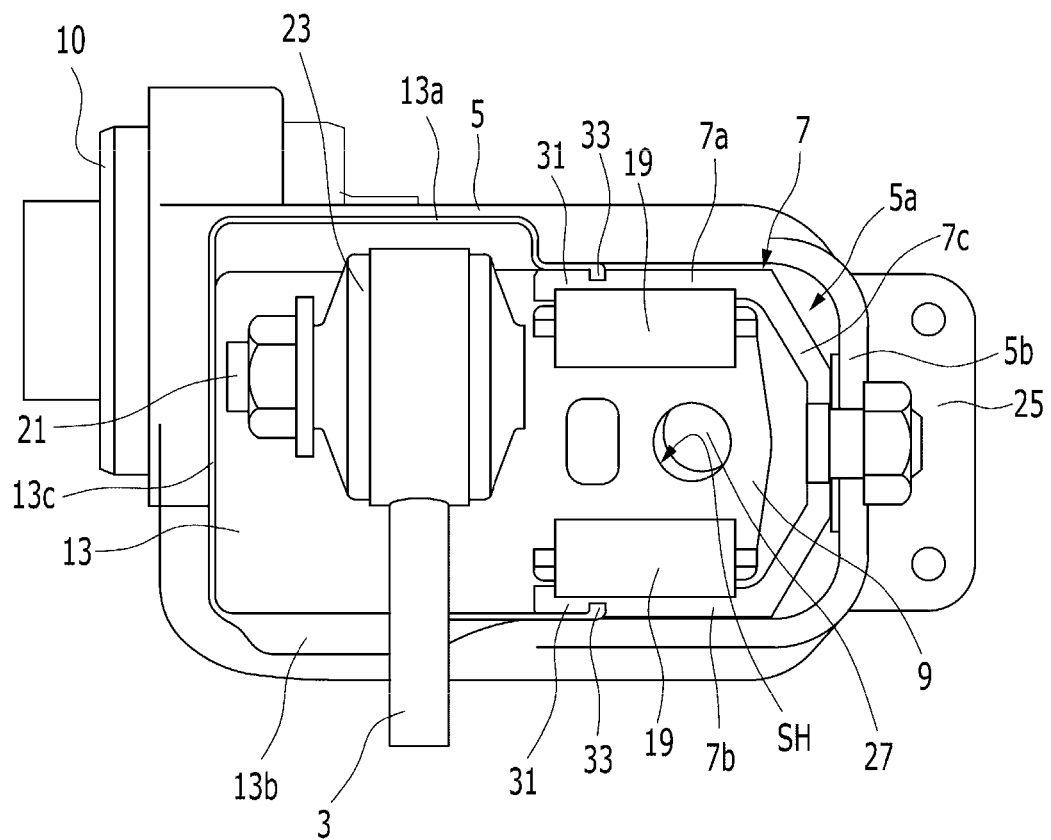
FIG. 6 is a cross-sectional view of an exemplary active roll control system according to the present invention.

Referring to FIG. 6, a middle portion of the upper arm 5 being the suspension arm is bent such that a space 5a opened toward one direction is formed in the middle portion. Both ends of the upper arm 5 are connected respectively to the sub frame 15 and a knuckle 16 through bushings 10.

In addition, the rail plate 7 is mounted in the space 5a through an opening of the upper arm 5.

Such the rail plate 7 has "C"-shape where an upper surface 7a and a lower surface 7b are connected through a side 7c.

In addition, the side 7c of the rail plate 7 is engaged to a side 5b of the upper arm 5 by a bolt.

In addition, a screw hole SH is formed at a center portion of the connector 9. Roller bearings 19 are mounted at upper and lower portions of the connector 9 such that the connector 9 is guided by the upper surface 7a and the lower surface 7b of the rail plate 7 in a state of being slidably supported by the roller bearing 19.

At this time, a pair of roller bearings 19 is mounted at an upper portion of the connector 9 and a pair of roller bearings 19 is mounted at a lower portion of the connector 9. However, the number of the roller bearings 19 can be set arbitrarily.

A connecting end 21 is formed at a side of the connector 9, and an end of the stabilizer link 3 is connected to the connecting end 21.

That is, the connecting end 21 of the connector 9 is rotatably assemble to an upper end of the stabilizer link 3 through a bushing 23.

In addition, the drive motor 11 is engaged to an inboard end 25 of the upper arm 5, and a rotation shaft of the drive motor 11 is formed as a screw shaft 27 so as to be engaged to the screw hole SH. As the screw shaft 27 rotates, the connector 9 moves linearly along the rail plate 7.

At this time, a front end of the screw shaft 27 is rotatably supported by a bearing B press-fitted to an outboard end of the upper arm 5.

Herein, the drive motor 11 may be a servo motor, rotation speed and rotating direction of which can be controlled.

In addition, the drive motor 11 may be assembled to the inboard end 25 of the upper arm 5 with a spacer 29 being interposed therebetween.

In addition, a slot S is formed at a lower surface 13b of the cover 13. The slot S can receive the stabilizer link 3 and the stabilizer link 3 is movable in the slot S. The cover 13 is engaged to the opening of the upper arm 5 in a state of being engaged to the rail plate 7.

In order to couple the rail plate 7 with the cover 13, catching grooves 31 are formed respectively at the upper surface 7a and the lower surface 7b of the rail plate 7 and catching protrusions 33 in which the catching grooves 31 is inserted are formed at the upper surface 13a and the lower surface 13b of the cover 13.

In addition, the cover 13 is assembled to outboard and inboard end portions of the opening of the upper arm 5 by bolts.

The drive motor 11 mounted at the inboard end 25 of the upper arm 5 is driven according to a driving condition of the vehicle so as to control a mounting position of the stabilizer link 3 on the upper arm 5.

Then, a lever ratio of the stabilizer link 3 is changed and roll rigidity of the stabilizer bar 1 is also changed. Therefore, roll rigidity of the vehicle can be actively controlled.

Hereinafter, operation of the active roll control system according to various embodiments of the present invention will be described in detail, referring to FIG. 7.

Figure 7:
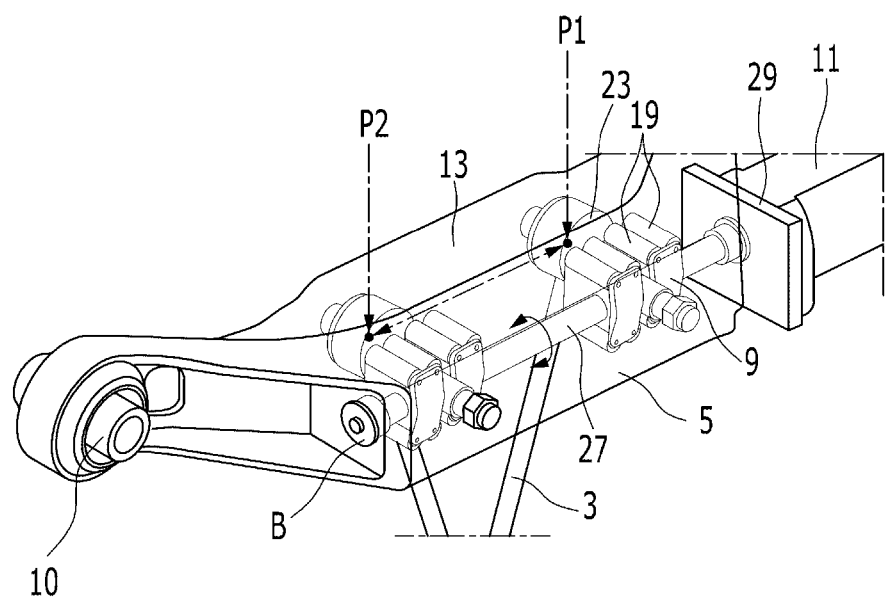
FIG. 7 is a schematic diagram for showing an operation of an exemplary active roll control system according to the present invention.

In a case that the vehicle runs straight, the connector 9 for determining the mounting position of the stabilizer link 3 on the upper arm 5 is positioned at "P1" in FIG. 7 and the roll rigidity of the stabilizer bar 1 is maintained to be an initial value.

If the vehicle turns at this state, a controller controls the drive motor 11 to rotate in one direction based on signals output from an acceleration sensor, a height sensor, and a steering sensor.

Then, the connector 9 on the screw shaft 27 moves to "P2" in FIG. 7 and the lever ratio of the stabilizer link 3 is increased. Therefore, the roll rigidity of the stabilizer bar 1 is also increased. In addition, the mounting position (P1→P2) of the stabilizer link 3 on the upper arm 5 is also moved to P2 at which the upper arm 5 can move in larger range.

As described above, the active roll control system according to various embodiments of the present invention operates the drive motor 11 according to the driving condition of the vehicle such that the mounting position of the stabilizer link 3 on the upper arm 5 can be controlled. Therefore, the lever ratio of the stabilizer link 3 is changed and the roll rigidity of the vehicle is actively controlled so as to enhance turning stability of the vehicle.

Particularly, the mounting position of the stabilizer link 3 on the upper arm 5 is changed to a position where the upper arm 5 can move in larger range when the vehicle turns. Therefore, roll of the vehicle body is actively controlled by means of stronger roll suppressing force.

Since the motor mounted at a side of the upper arm 5 is used as a driving source, control of the ARCS is simplified compared with an ARCS of hydraulic pressure type. Since a complex hydraulic pressure supply system is not mounted at the vehicle body, a layout is improved.

Since a shape of the upper arm 5 that is the suspension arm is "C" shape, offset between the stabilizer link 3 and the upper arm 5 may be minimized. Since the connector guided through the roller bearing is used, effect of torsional moment may be minimized and operating efficiency may be improved.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active roll control system adapted to actively control roll rigidity of a vehicle by adjusting a mounting position of a stabilizer link connecting a suspension arm with a stabilizer bar of the vehicle on the suspension arm according to a driving condition of vehicle, the active roll control system comprising:
    a rail plate mounted in a space opened to one direction, the space being formed by bending a middle portion of the suspension arm;
    a connector having a screw hole formed at a center portion thereof and a connecting end formed at one side surface thereof and connected to an end of the stabilizer link, upper and lower portions of the connector being mounted on the rail plate so as to be movable along the rail plate;
    a drive motor coupled to an inboard end of the suspension arm and provided with a rotation shaft, the rotation shaft being engaged to the screw hole such that the connector is movable along the rail plate; and
    a cover engaged to the suspension arm so as to cover the space in a state of being coupled with the rail plate and having a slot formed at a lower surface thereof, the stabilizer link being inserted in and movable along the slot.

2. The active roll control system of claim 1, further comprising roller bearings mounted at the upper and lower portions of the rail plate.

3. The active roll control system of claim 1, wherein the suspension arm is an upper arm rotatably connected to a sub frame and a knuckle of the vehicle.

4. The active roll control system of claim 2, wherein upper and lower surfaces of the rail plate are connected to each other by a side thereof such that the roller bearings of the connector are slidably supported by the upper and lower surfaces of the rail plate.

5. The active roll control system of claim 4, wherein the side of the rail plate is assembled to a side of the suspension arm by a bolt.

6. The active roll control system of claim 2, wherein a pair of roller bearings is mounted at the upper portion of the connector and a pair of roller bearings is mounted at the lower portion of the connector.

7. The active roll control system of claim 1, wherein an upper end of the stabilizer link is rotatably assembled to the connecting end of the connector.

8. The active roll control system of claim 1, wherein a front end of the rotation shaft is rotatably supported by a bearing press-fitted to an outboard end of the suspension arm.

9. The active roll control system of claim 1, wherein the drive motor is a servo motor, rotation speed and rotating direction of which can be controlled.

10. The active roll control system of claim 1, wherein the drive motor is assembled to the inboard end of the suspension arm with a spacer being interposed therebetween.

11. The active roll control system of claim 1, wherein catching grooves are formed respectively at the upper and lower surfaces of the rail plate, and catching protrusions inserted in the catching grooves are formed respective at upper and lower surfaces of the cover.

12. The active roll control system of claim 1, wherein the cover is assembled respectively to outboard and inboard end portions of the opening of the suspension arm by bolts.

\* \* \* \* \*